Patented Sept. 16, 1941

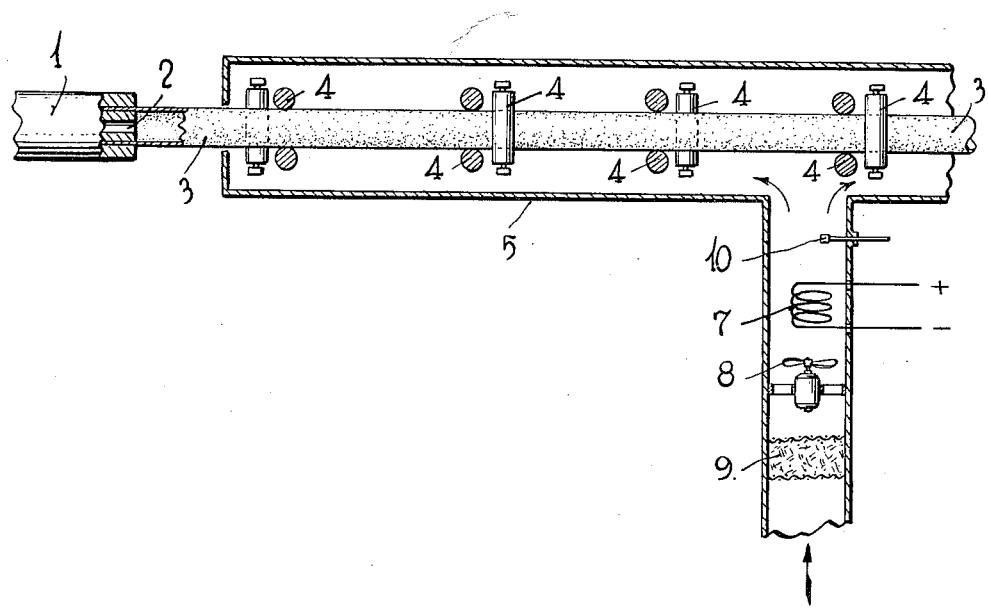

2,256,040

UNITED STATES PATENT OFFICE 2,256,040

PROCESS FOR DRYING ARTIFICIAL GUT PRODUCED FROM ANIMAL FIBROUS MATERIAL

Oskar Walter Becker, Heidelberg, and Emil Weiss, Weinheim, Germany

Original application October 10, 1936, Serial No. 105,144. Divided and this application November 12, 1937, Serial No. 174,258. In Germany October 15, 1935

4 Claims. (Cl. 34—23)

This invention concerns a process for drying artificial gut produced from animal fibrous material.

The present application is a division of our copending application, S. N. 105,144, filed Oct. 10, 1936.

It has already been proposed to produce artificial gut from animal fibrous material, for example hide or sinews, by converting the hide by the action of swelling chemicals, particularly bases and/or acids and by mechanical shredding into a plastic mass consisting of swollen fibres and shaping this plastic mass into the form of a tube by extrusion from annular nozzles. The chemical disintegration of the hide may be replaced by heat disintegration or biological loosening or opening up, supplemented by mechanical resolution.

The artificial gut so obtained is dried, for example by treatment with hot air and hardened in a suitable manner, for example with the aid of distillates from cellulose-containing substances, such as wood.

When carrying out the aforesaid process, particularly when employing fibrous masses containing large proportions of water (e. g. masses containing less than 15% of dry substance) it was found that considerable irregularities in quality frequently occurred in the finished artificial gut, resulting in considerable differences in strength. It was further found that spots occurred at various points on artificial gut of insufficient tensile strength and that these spots are due to non-uniform hardening at these points.

The aforesaid irregularities also occurred when working up like starting materials and when maintaining the conditions of disintegrating these starting materials into the fibrous masses to be extruded from nozzles and the conditions of shaping completely constant.

Protracted investigations showed that these irregularities are caused by the conditions of drying. Measurements of the temperature and the moisture content of the fresh and the used (considerably enriched with water vapour) dry air respectively showed that the drying temperature must on the one hand be as high as possible, in order to effect as rapid drying as possible, but on the other hand, when exceeding certain limits, gives rise to so-called heat phenomena, resulting in a reduction of the tensile strength of the dry gut and in non-uniformity of drying. These limits of the drying temperature are dependent on the moisture content of the air.

According to this invention it has been found that in order to produce artificial gut of uniform quality the drying temperature in the process of drying the gut by rinsing on all sides with hot air must be so adjusted in accordance with the moisture content of the air that, until the dry substance content of the gut has reached 60%, the temperature of the gut produced from alkaline fibrous paste does not exceed 22° C.

When maintaining these conditions the so-called heat phenomena with their consequences could not longer be observed. At first the result appears completely surprising. It was attempted to explain the heat phenomena by partial melting of the gut mass. The melting point of the gut substance is dependent on the dry substance content of the mass and amounts, for example in the case of gut produced from acid fibrous masses and having dry substance content of from 10 to 12% the melting point is from 35 to 37° C. A certain alteration of the gut substance, which may possibly be the cause of the heat phenomena, was, however, observed at 28 to 30° C. At this temperature the sharply defined limit between fibres and binding substance disappears. This is probably due to the melting of the albuminous substance connecting the gut fibres.

Exact determination of the temperature, at which these heat phenomena occur, is very difficult, since the optical effect also extends over several degrees. The heat phenomena only become distinctly recognisable during the subsequent tanning operation and then immediately manifest themselves in the hereinbefore described disturbing manner. It is also found thereby that the gut reacts sensitively to a ½° C. rise when exceeding the limits of 22° C. Within the observed limits it was not possible to establish that there was any connection between the dry substance content of the mass and the heat phenomena which occurred The process of this invention is with advantage carried into effect by drying the artificial gut discharging from the annular nozzle in the form of a continuous tube. Preferably air is blown from the nozzle head into the interior of the tube being formed and the artificial gut dried in this inflated condition. The continuous artificial gut is conveyed through drying channels, into which hot air is blown.

The moisture content of the air is measured with the aid of a psychrometer and on the basis of the relationship between this moisture content, the temperature of the dry thermometer and the temperature of the wet thermometer a drying temperature is selected, at which the temperature of the wet thermometer does not exceed 22° C. So long as the drying operation is so conducted that on progressive drying the temperature of the dry air falls, whilst the temperature of the moist thermometer remains constant, the temperature of the gut corresponds to the temperature of the moist thermometer. The temperature of the drying air falls during the drying of the gut over which it is passed as the evaporation of moisture from the gut consumes heat. The water evaporated from the gut simultaneously increases the humidity of the drying air.

In order to convey the gut during the process of manufacture through the drying channel, it is disposed on easily rotatable rollers approached at relatively large intervals, by conveyor belts. Since at the points where the gut is supported on the rollers or conveyor belts evaporation of the water contained in the parts of the gut in direct contact therewith is checked, there is a possibility, when rollers and conveyor belts have acquired the elevated temperature of the dry air, of the corresponding parts of the gut being heated above the temperature of the wet thermometer. In order to avoid this, the diameters of the rollers and the lengths of the conveyor belts must be selected as small as possible and the surfaces provided with openings, e. g. grooves, so that the contact surfaces with the gut may be as small as possible. In order to prevent considerable transference of heat to the points of contact, the rollers and conveyor belts must be made of a low heat-conducting material, for example wood, cork or bast. In addition a material is with advantage selected, in which heat radiation is only slight or the material is provided with a coat of paint, which reduces heat radiation, for example aluminium-bronze varnish. As a precautionary measure the temperature of the drying gut is also maintained a few degrees centigrade below the temperature, at which the heat phenomena occur, for example, at 22° C.

Since the drying temperature may be the higher, the lower is the moisture content of the air, it is advisable to reduce the moisture content of the air by precooling in order to shorten the period of drying. The precooling may be effected both with cold water and with freezing mixtures.

The dry gut is rendered waterproof in suitable manner, for example by painting over or spraying with distillates of cellulose-containing substances, again dried and rolled up.

The accompanying drawing diagrammatically shows, by way of example, an apparatus for carrying out the process according to the present invention.

With reference to the drawing, artificial gut is extruded from an annular opening in nozzle 1 while air is blown into the interior of the extruded gut from aperture 2. The gut is then conveyed through the drying chamber 5 with the aid of rollers 4 while drying air, the wet bulb temperature of which does not exceed 22° C., is passed through such chamber. The moisture content of the drying air which is passed through the chamber is first adjusted in a dryer and is then blown through the heater 7 into the drying chamber by the blower 8. The wet bulb thermometer 10 of a psychrometer serves to indicate the temperature assumed by the drying gut as it is dried with the heated drying air.

What we claim is:

1. In a process for the production of artificial gut from fibrous animal starting materials by treating the said starting materials with swelling chemicals and finally with bases, shredding the swollen material, extruding the resulting swollen fibrous masses from a nozzle containing an annular orifice and drying the resulting artificial gut by passing unsaturated, hot, drying air thereover, the improvement which consists in adjusting the temperature of the unsaturated, hot drying air throughout the entire drying step to a temperature which when registered by a wet thermometer of a psychrometer arranged in such drying air does not exceed 22° C. whereby the temperature of the drying artificial gut does not exceed 22° C.

2. A process according to claim 1, wherein air is blown from the head of the annular nozzle into the interior of the artificial gut discharging from the annular orifice and the inflated artificial gut is conveyed in the form of a continuous tube through a drying space and unsaturated, hot, drying air is passed over the artificial gut in said drying space.

3. In a process for the production of artificial gut from fibrous animal starting materials by treating the said starting materials with swelling materials and finally with bases, shredding the swollen material, extruding the resulting swollen fibrous masses from a nozzle containing an annular orifice and drying the resulting artificial gut in a drying space by passing unsaturated, hot, drying air thereover, the improvement which consists in contacting the artificial gut discharged from the annular orifice with moving surfaces of poor heat conducting material, and conveying such artificial gut thereby through said drying space and adjusting the temperature of the unsaturated, hot drying air throughout the entire drying step to a temperature which when registered by a wet thermometer of a psychrometer arranged in such drying air does not exceed 22° C. whereby the temperature of the artificial gut does not exceed 22° C.

4. A process according to claim 1, comprising in addition the step of reducing the moisture content of the drying air before it is heated.

OSKAR WALTER BECKER.
EMIL WEISS.